(12) United States Patent
Yu

(10) Patent No.: US 8,534,856 B2
(45) Date of Patent: Sep. 17, 2013

(54) BACKLIGHT MODULE AND LAMP SOCKET STRUCTURE THEREOF

(75) Inventor: Gang Yu, Shenzhen (CN)

(73) Assignee: Shenzhen China Star Optoelectronics Technology Co., Ltd., Shenzhen, Guangdong Province (CN)

( * ) Notice: Subject to any disclaimer, the term of this patent is extended or adjusted under 35 U.S.C. 154(b) by 368 days.

(21) Appl. No.: 12/991,432

(22) PCT Filed: Sep. 1, 2010

(86) PCT No.: PCT/CN2010/076524
§ 371 (c)(1),
(2), (4) Date: Nov. 6, 2010

(87) PCT Pub. No.: WO2011/160336
PCT Pub. Date: Dec. 29, 2011

(65) Prior Publication Data
US 2012/0206902 A1    Aug. 16, 2012

(30) Foreign Application Priority Data

Jun. 24, 2010   (CN) .......................... 2010 1 0209152

(51) Int. Cl.
*G09F 13/04*    (2006.01)
(52) U.S. Cl.
USPC ...................................... 362/97.1

(58) Field of Classification Search
USPC ...................................... 362/97.1
See application file for complete search history.

(56) References Cited

U.S. PATENT DOCUMENTS

2006/0284560 A1*  12/2006  Park et al. .................. 313/634
2009/0209126 A1*  8/2009  Takata et al. ................ 439/366

FOREIGN PATENT DOCUMENTS

| CN | 1737667 A | 2/2006 |
| CN | 101144596 A | 3/2008 |
| CN | 201078663 Y | 6/2008 |
| CN | 201475915 U | 5/2010 |
| JP | 2008210806 A | 9/2008 |
| KR | 100780739 B1 | 11/2007 |

* cited by examiner

*Primary Examiner* — Anh Mai
*Assistant Examiner* — Hana Featherly
(74) *Attorney, Agent, or Firm* — Cheng-Ju Chiang

(57) ABSTRACT

The present invention provides a backlight module and a lamp socket structure thereof. The lamp socket uses a conductive sleeve to receive and electrically connect to a lead wire of a backlight lamp, and the conductive sleeve is extended downward to form two elastic plug plates for connecting to two elastic receptacle plates of a conductive receptacle. Then, the conductive receptacle is further connected to an insulation base. The design of the present invention can efficiently avoid the lamp breakage problem due to vibrations of lead wires, so as to surely increase the stability of mounting lamps and the reliability of electrically connecting to the lamps.

14 Claims, 6 Drawing Sheets

BACKLIGHT MODULE AND LAMP SOCKET STRUCTURE THEREOF

FIELD OF THE INVENTION

The present invention relates to a backlight module and a lamp socket structure thereof, and more particularly to a backlight module and lamp socket structure thereof for increasing the stability of mounting lamps and the reliability of electrically connecting to the lamps.

BACKGROUND OF THE INVENTION

Nowadays, for the convenience of installation and transportation, many components are generally installed into various modules in advance during the mass production of liquid crystal displays (LCDs). For example, a backlight module is constructed by backlight sources, a housing and a diffuser plate, and then a LCD module is constructed by the backlight module, a LCD panel and a front frame.

For example, referring now to FIG. 1, an assembled top view of a traditional backlight module is illustrated, wherein a backlight module 10 substantially comprises a reflector sheet 11, a plurality of backlight lamps 12, a plurality of fasteners 13, two support portions 14 and a plurality of sockets 15. The backlight lamps 12 are mounted on the reflector sheet 11 through the fasteners 13, while each of two ends of the backlight lamps 12 has a lead wire 121. The sockets 15 are disposed on the support portions 14, and have an insulation base 151 and two elastic contact plates 152, respectively. The insulation base 151 is used to support one end of the backlight lamps 12, while the two elastic contact plates 152 are used to elastically engage with and electrically connected to the lead wire 121.

However, there are some problems existing in the actual use of the sockets 15, as follows: when the lead wire 121 of the backlight lamp 12 is pushed into the two elastic contact plates 152 of the socket 15, excessive force during installation may easily cause the breakage of a connection position between the lead wire 121 and the backlight lamp 12 and thus cause the leakage of gas in the backlight lamp 12, resulting in the malfunction of the backlight lamp 12 and affecting the yield of lamp installation.

Furthermore, referring now to FIG. 2, another assembled top view of a traditional backlight module is illustrated, wherein a backlight module 20 substantially comprises a reflector sheet 21, a plurality of backlight lamps 22, a plurality of fasteners 23, two support portions 24 and a plurality of sockets 25. The backlight lamps 22 are mounted on the reflector sheet 21 through the fasteners 23, while each of two ends of the backlight lamps 22 is sleeved with an electrode terminal 221. The socket 25 is disposed on the support portions 24, and has two curved elastic arms for elastically engaging with and electrically connecting to the electrode terminals 221 on the two ends of the backlight lamp 22.

However, there are still some problems existing in the actual use of the sockets 25, as follows: the backlight lamp 22 has a lead wire firstly connected to the electrode terminal 221, and then the electrode terminal 221 is mounted on the socket 25. But, in a bad installation condition, the electrode terminals 221 are easily loose to cause that there is no a firmly electrical connection between the electrode terminals 221 and the internal lead wires, or to cause that the electrode terminals 221 are separated from the ends of the backlight lamp 22, so as to affect the quality of electrical connection of lamps.

As a result, it is necessary to provide a backlight module and a lamp socket structure thereof to solve the problems existing in the conventional technologies, as described above.

SUMMARY OF THE INVENTION

A primary object of the present invention is to provide a backlight module and a lamp socket structure thereof, which use a conductive sleeve to receive and electrically connect to a lead wire of a backlight lamp, and the conductive sleeve is extended downward to form two elastic plug plates for connecting to two elastic receptacle plates of a conductive receptacle, wherein the conductive receptacle is further connected to an insulation base. The foregoing design can efficiently avoid the lamp breakage problem due to vibrations of lead wires, so as to surely increase the stability of mounting lamps and the reliability of electrically connecting to the lamps.

A secondary object of the present invention is to provide a backlight module and a lamp socket structure thereof, wherein the two elastic plug plates of the conductive sleeve can selectively use projections, openings, recesses or pins to connect with the two elastic receptacle plates of the conductive receptacle, so as to increase the convenience and stability of the lamp socket.

To achieve the above object of the present invention, the present invention provides a lamp socket structure which comprises: a conductive sleeve having an electrical connection hole and two elastic plug plates, wherein the shape of the electrical connection hole is corresponding to that of an end of a backlight lamp and a lead wire on the end; a conductive receptacle having two elastic receptacle plates and an external terminal, wherein the two elastic receptacle plates are electrically connected to the two elastic plug plates; and an insulation base having a receptacle hole and an external hole communicated with each other, wherein the external terminal and the two elastic receptacle plates are inserted into the receptacle hole, and the external terminal is aligned with the external hole.

Furthermore, the present invention further provides a backlight module which comprises:

at least two lamp sockets, wherein each of the lamp sockets comprises: a conductive sleeve having an electrical connection hole and two elastic plug plates; a conductive receptacle having two elastic receptacle plates and an external terminal, wherein the two elastic receptacle plates are electrically connected to the two elastic plug plates; and an insulation base having a receptacle hole and an external hole communicated with each other, wherein the external terminal and the two elastic receptacle plates are inserted into the receptacle hole, and the external terminal is aligned with the external hole; and at least one backlight lamp, wherein each of two ends of the backlight lamp comprises a lead wire, and the shape of the electrical connection hole is corresponding to that of the end and the lead wire of the backlight lamp.

In one embodiment of the present invention, the electrical connection hole comprises a U-shape hole portion and an elongated hole portion, wherein the end of the backlight lamp is matched with the U-shape hole portion, and the lead wire of the backlight lamp is matched with the elongated hole portion.

In one embodiment of the present invention, the elongated hole portion or the U-shape hole portion further comprises a spring therein, so as to elastically abut against the lead wire of the backlight lamp.

In one embodiment of the present invention, the two elastic plug plates are symmetrically extended downward from two sides of a lower edge of an opening of the electrical connection hole, respectively.

In one embodiment of the present invention, each of the two elastic plug plates of the conductive sleeve has at least one opening or recess, and each of the two elastic receptacle plates of the conductive receptacle has at least one projection, wherein the projection is correspondingly engaged with the opening or recess.

In one embodiment of the present invention, each of the two elastic plug plates of the conductive sleeve has at least one projection, and each of the two elastic receptacle plates of the conductive receptacle has at least one opening or recess, wherein the projection is correspondingly engaged with the opening or recess.

In one embodiment of the present invention, the two elastic receptacle plates are symmetrically extended upward from two sides of an upper portion of the conductive receptacle, and the external terminal is vertically bent from a lower portion of the conductive receptacle.

In one embodiment of the present invention, each of the two elastic plug plates of the conductive sleeve has at least one first opening, and each of the two elastic receptacle plates of the conductive receptacle has at least one second opening, wherein the first opening is corresponding to the second opening, and the lamp socket further comprises at least one pin, wherein the pin can pass through the first and second openings to connect the two elastic plug plates and the two elastic receptacle plates.

In one embodiment of the present invention, the insulation base further comprises at least one pin hole, wherein the pin hole is corresponding to the first and second openings, and the pin can pass through the pin hole and the first and second openings.

In one embodiment of the present invention, the lamp socket further comprises at least one bolt, and the pin further has at least one bolt hole, wherein the bolt is engaged in the bolt hole of the pin.

In one embodiment of the present invention, the receptacle hole of the insulation base comprises a communication hole and two slot holes, wherein the external terminal is inserted into the communication hole, and the two elastic receptacle plates are inserted into the two slot holes.

DETAILED DESCRIPTION OF THE PREFERRED EMBODIMENTS

Figure 1:
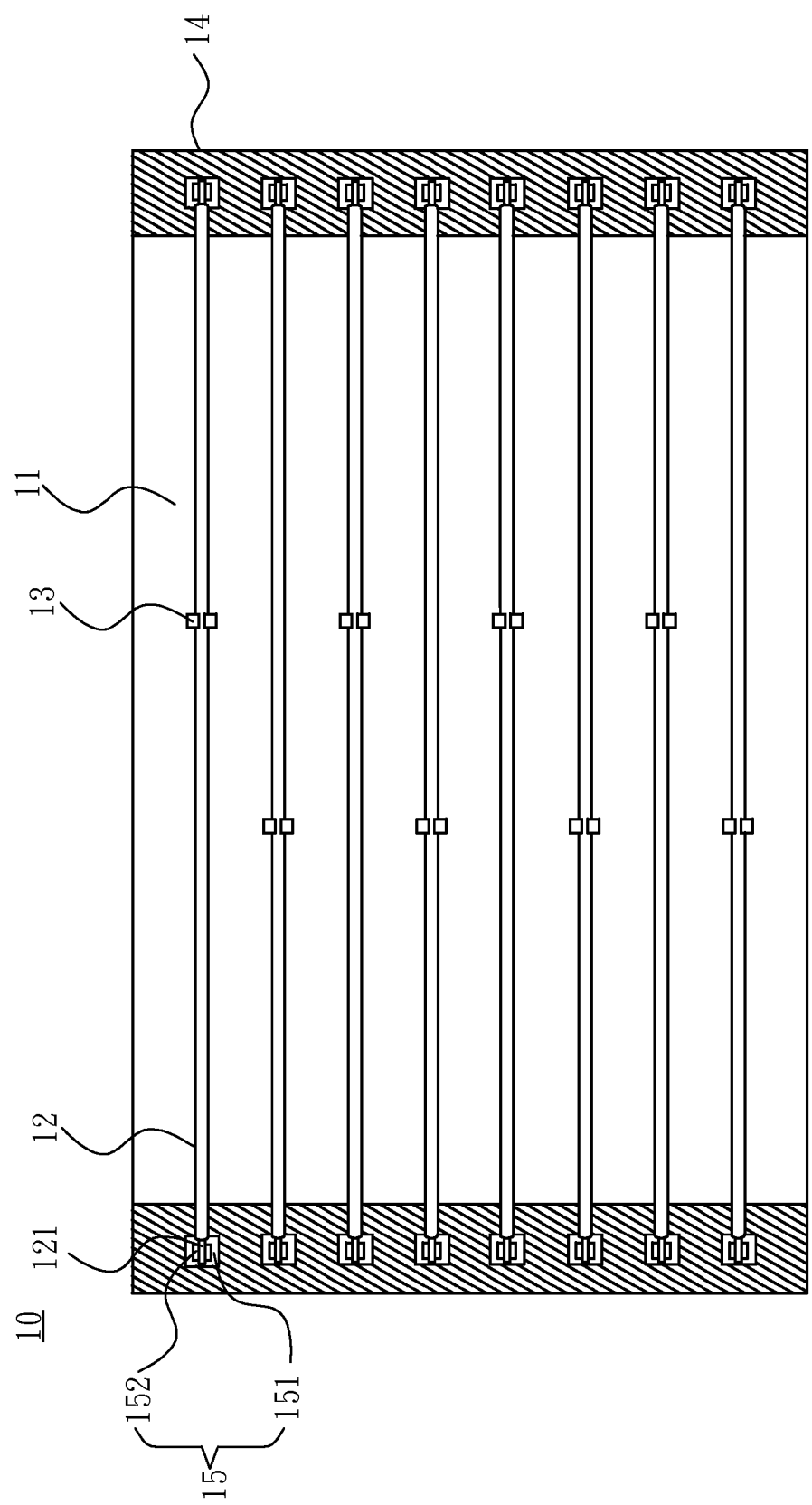
FIG. 1 is a schematic view of a traditional backlight module and a lamp socket structure thereof.
Figure 2:
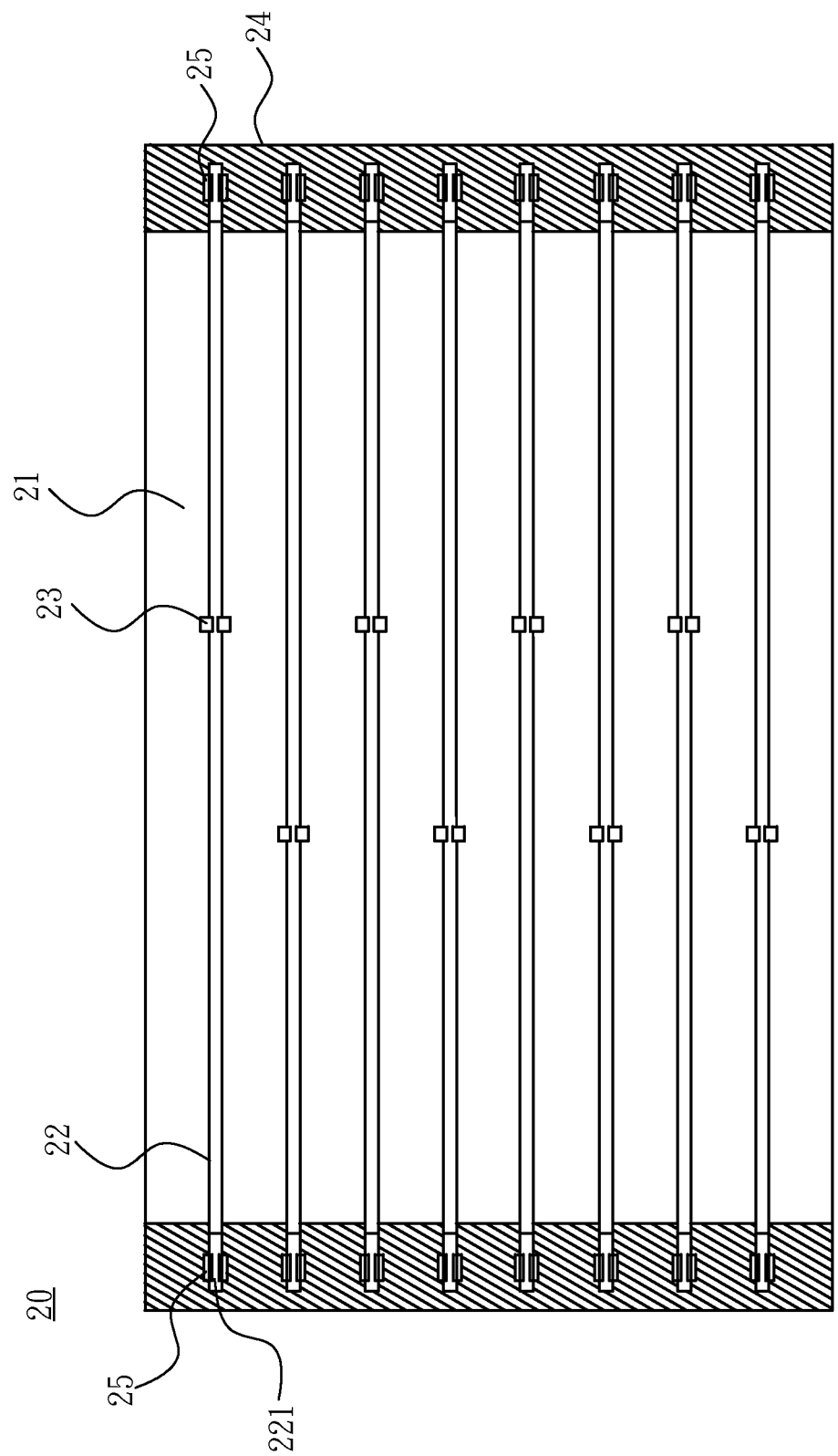
FIG. 2 is another schematic view of a traditional backlight module and a lamp socket structure thereof.
Figure 3:
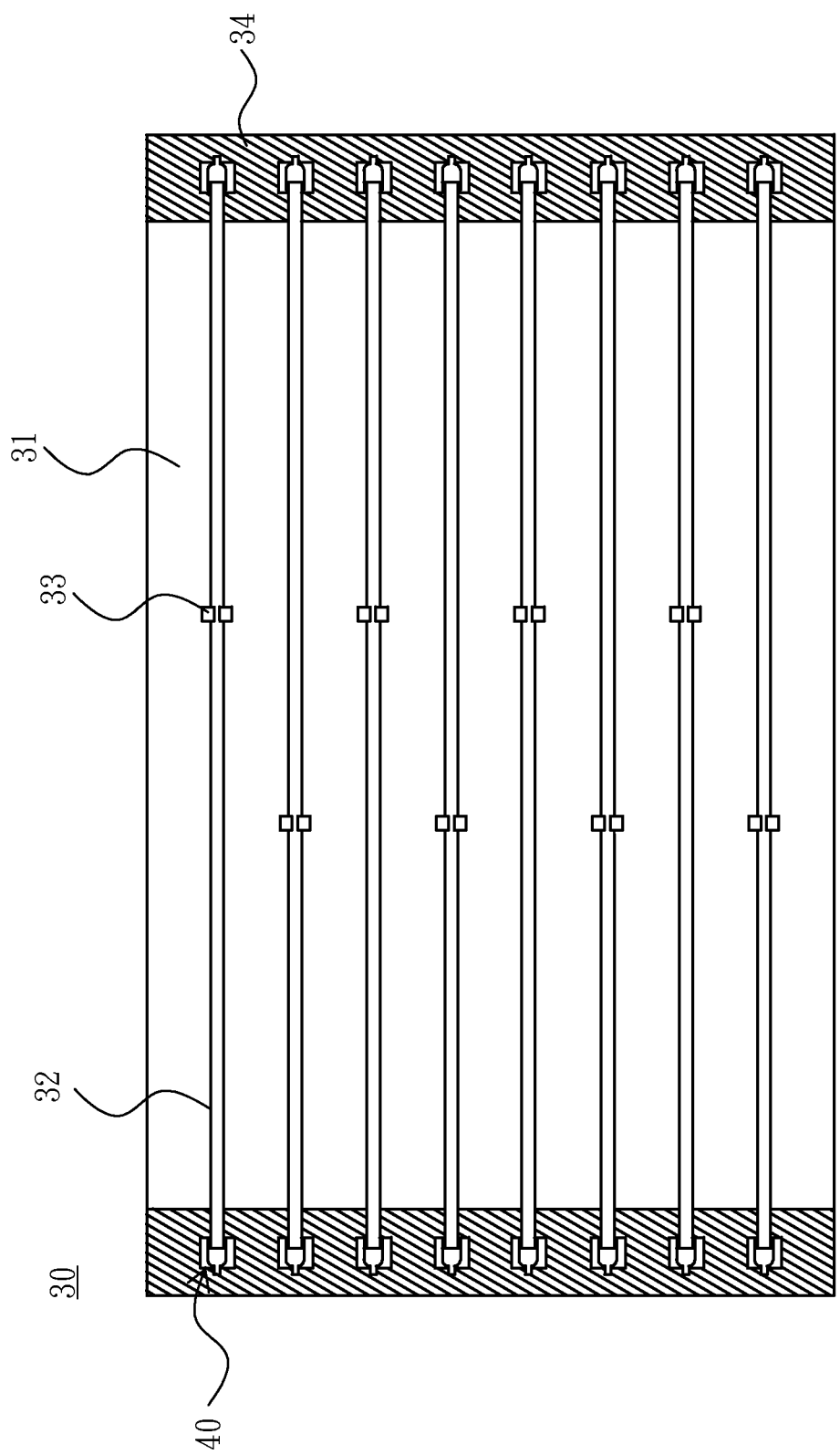
FIG. 3 is a schematic view of a backlight module and a lamp socket structure thereof according to a first embodiment of the present invention.

The structure and the technical means adopted by the present invention to achieve the above and other objects can be best understood by referring to the following detailed description of the preferred embodiments and the accompanying drawings, wherein:

Referring now to FIG. 3, an assembled top view of a backlight module according to a first embodiment of the present invention is illustrated, wherein a backlight module 30 is mainly applied to the field of liquid crystal displays (LCDs), and the backlight module 30 comprises a reflector sheet 31, at least one backlight lamp 32, a plurality of fasteners 33, two support portions 34 and at least two lamp sockets 40. The present invention will describe the foregoing elements by a preferred embodiment, as follows:

Referring to FIG. 3, the backlight module 30 according to the first embodiment of the present invention generally uses a rectangular outer frame (not-shown) to install the reflector sheet 31, the backlight lamps 32 and other optical sheets, such as a diffuser plate, a diffuser sheet, a prism sheet and etc. The reflector sheet 31 is used to reflect a backlight source generated by the backlight lamps 32. The reflector sheet 31 is formed with a plurality of installation holes on suitable positions for combining with the fasteners 33. The backlight lamps 32 are supported and mounted on the reflector sheet 31 by the fasteners 33. The backlight lamps 32 are preferably cold cathode fluorescent lamps (CCFLs), but not limited thereto. Other optical sheets of the backlight module 30 (such as a diffuser plate, a diffuser sheet, a prism sheet and etc.) are disposed on the backlight lamps 32 and the fasteners 33. Furthermore, the two support portions 34 are located on two sides of the reflector sheet 31, and the support portion 34 is a projected base on which is mounted with the lamp sockets 40. The lamp sockets 40 can be electrically connected to a positive electrode or a negative electrode of an external power supply. Moreover, in some conditions, the backlight module 30 may omit the support portions 34, and the lamp sockets 40 may be directly mounted on two sides of the reflector sheet 31.

Figure 4:
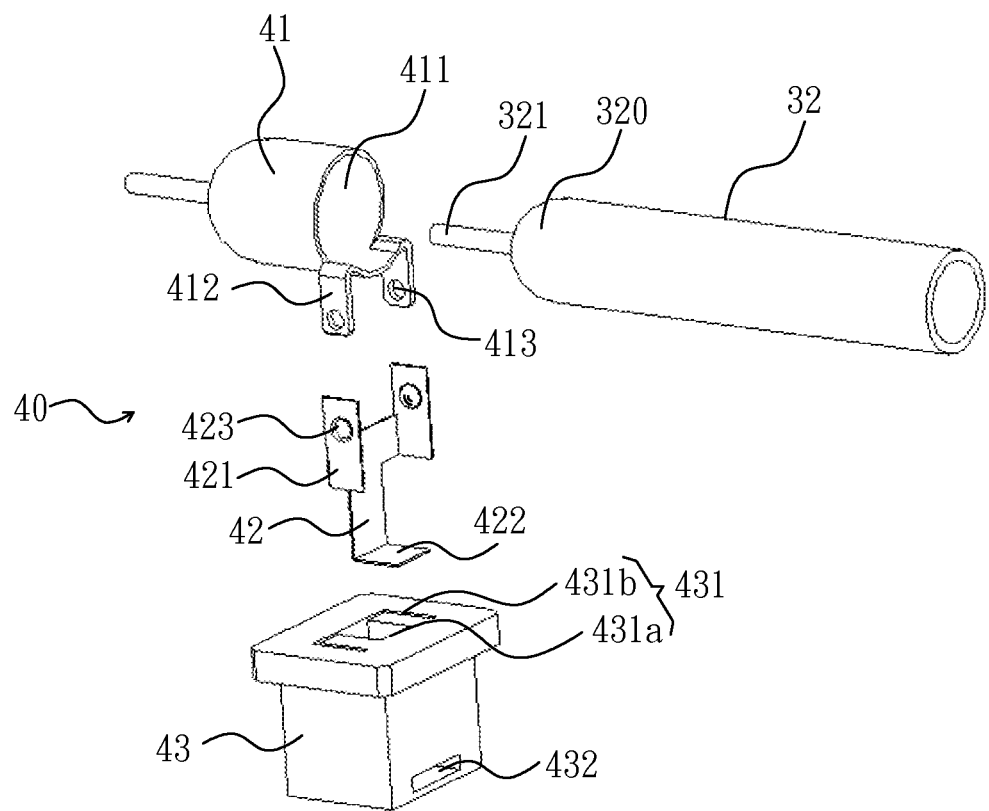
FIG. 4 is a schematic view of the lamp socket structure according to the first embodiment of the present invention.
Figure 4A:
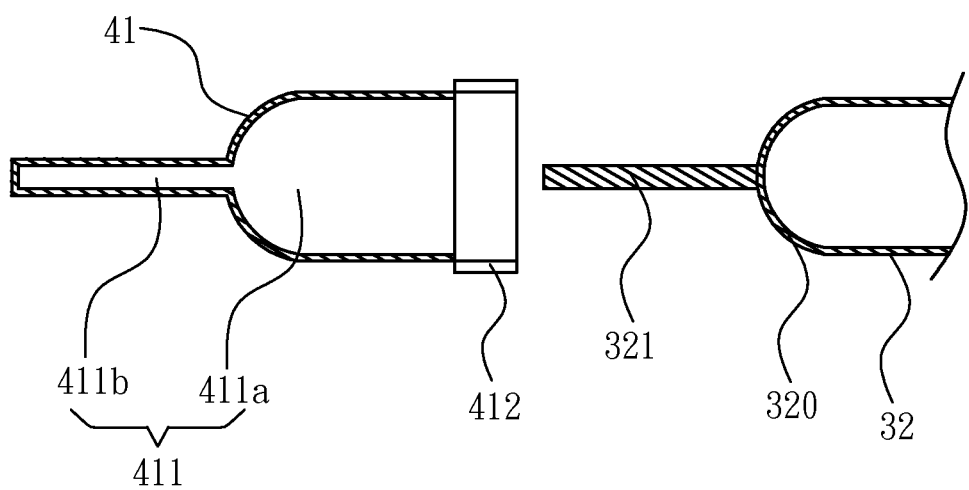
FIG. 4A is a horizontal cross-sectional view of the conductive sleeve in FIG. 4 of the present invention.

Referring to FIGS. 4 and 4A, each of the lamp sockets 40 according to the first embodiment of the present invention is used to mount and electrically connect to a lead wire 321 of one end 320 of each of the backlight lamps 32, wherein each of the lamp sockets 40 comprises a conductive sleeve 41, a conductive receptacle 42 and an insulation base 43. As shown in FIG. 4, the conductive sleeve 41 is preferably a cylindrical hollow structure formed by punching or casting metal material, and mainly has an electrical connection hole 411 and two elastic plug plates 412. The electrical connection hole 411 is formed in the conductive sleeve 41 and the shape of the electrical connection hole 411 is corresponding to that of the end 320 of the backlight lamp 32 and the lead wire 321 on the end 320. For more details, as shown in FIG. 4A, from the horizontal cross-sectional view of the electrical connection hole 411, the electrical connection hole 411 comprises a U-shape hole portion 411a and an elongated hole portion 411b, wherein the shape of the U-shape hole portion 411a is matched with that of the end 320 of the backlight lamp 32, and the shape of the elongated hole portion 411b is matched with that of the lead wire 321 of the backlight lamp 32, wherein the inner diameter of the U-shape hole portion 411a is greater than that of the elongated hole portion 411b. Therefore, when the end 320 and the lead wire 321 of the backlight lamp 32 are inserted into the electrical connection hole 411, the end 320 of the backlight lamp 32 can be matched with the U-shape hole portion 411a, and the lead wire 321 of the backlight lamp 32 can be matched with the elongated hole portion 411b. Thus, the lamp breakage problem due to vibrations of lead wires can be efficiently avoided, so as to surely increase the stability of mounting lamps and the reliability of electrically connecting to the lamps. In other embodiment, if necessary, the elongated hole portion 411b or the U-shape hole portion 411a can further selectively comprise a spring (not-shown) therein for elastically abutting against the lead wire 321 of the backlight lamp 32. In addition, the two elastic plug plates 412 is mainly integrally formed on a lower edge position of an opening of the electrical connection hole 411, and the two elastic plug plates 412 are symmetrically extended downward about a distance from two sides of the lower edge position, respectively. In the embodiment, each of the two elastic plug plates 412 has at least one opening 413, but in other embodiment, the opening 413 can be replaced by recess, wherein the recess is sunk and formed on an outer surface of the two elastic plug plates 412.

Referring to FIG. 4, the conductive receptacle 42 according to the first embodiment of the present invention is preferably a multiple bent plate structure formed by punching or casting metal material, and mainly has two elastic receptacle plates 421 and an external terminal 422. The two elastic receptacle plates 421 are symmetrically extended upward about a distance from two sides of an upper portion of the conductive receptacle 42. In the embodiment, each of the two elastic receptacle plates 421 has at least one projection 423 which is projected and formed on an inner side surface of the two elastic receptacle plates 421, respectively. In the embodiment, the gap between the two elastic receptacle plates 421 is substantially equal to or slightly greater than the span distance between the two elastic plug plates 412. Thus, in installation, the two elastic plug plates 412 can be inserted into a space between the two elastic receptacle plates 421. In this case, the outer surface of the two elastic plug plates 412 can be tightly in contact with and electrically connected to the inner surface of the two elastic receptacle plates 421, while the projection 423 of the two elastic receptacle plates 421 can be correspondingly engaged with the opening 413 (or recess) of the two elastic plug plates 412, in order to ensure the reliability of the electrical connection between the two elastic receptacle plates 421 and the two elastic plug plates 412. However, the foregoing inner/outer installation relationship between the two elastic plug plates 412 and the two elastic receptacle plates 421 can be interchanged. Besides, the external terminal 422 is vertically bent from a lower portion of the conductive receptacle 42 toward (or away from) the backlight lamp 32, so that a lower portion of the external terminal 422 is L-shape in a side view thereof.

Referring to FIG. 4, the insulation base 43 according to the first embodiment of the present invention is preferably a base made of insulation material, such as thermoplastic resin, thermosetting resin, rubber and etc., wherein the insulation base 43 has a receptacle hole 431 and an external hole 432 communicated with each other. The receptacle hole 431 is formed on an upper surface of the insulation base 43, and comprises a communication hole 431a and two slot holes 431b, wherein the communication hole 431a and the two slot holes 431b are communicated with each other, and a common opening thereof is about E-shape. In installation, the external terminal 422 can be inserted into the communication hole 431a of the receptacle hole 431, and the two elastic receptacle plates 421 can be inserted into the two slot holes 431b of the receptacle hole 431, so as to stably embed the conductive receptacle 42 into the receptacle hole 431. Furthermore, the external hole 432 is formed on a side surface of the insulation base 43 facing (or away from) the backlight lamp 32, while the communication hole 431a of the receptacle hole 431 is extended downward and communicated with the external hole 432. After the external terminal 422 is inserted into the communication hole 431a from top to bottom, the external terminal 422 can move downward in the communication hole 431a to align with the external hole 432. Thus, the external hole 432 can be used to electrically connect with a projected terminal of a printed circuit board or other conductive plug (not-shown), so as to input a positive electricity or a negative electricity of an external power supply. Moreover, an upper portion of the insulation base 43 generally has a flange with a greater outer diameter, wherein the outer diameter of the flange is designed to be greater than the inner diameter of the installation hole (not-shown) on the support portion 34. Thus, when the insulation base 43 of the lamp socket 40 is installed on the support portion 34 of the backlight module 30, the flange of the insulation base 43 can be automatically installed and positioned in the installation hole on the support portion 34, so that the flange and the receptacle hole 431 of the insulation base 43 can be exposed out of the installation hole, while the external hole 432 of the insulation base 43 can be hidden in or below the support portion 34 for electrically connecting to a projected terminal of a printed circuit board or other conductive plug (not-shown).

Figure 5:
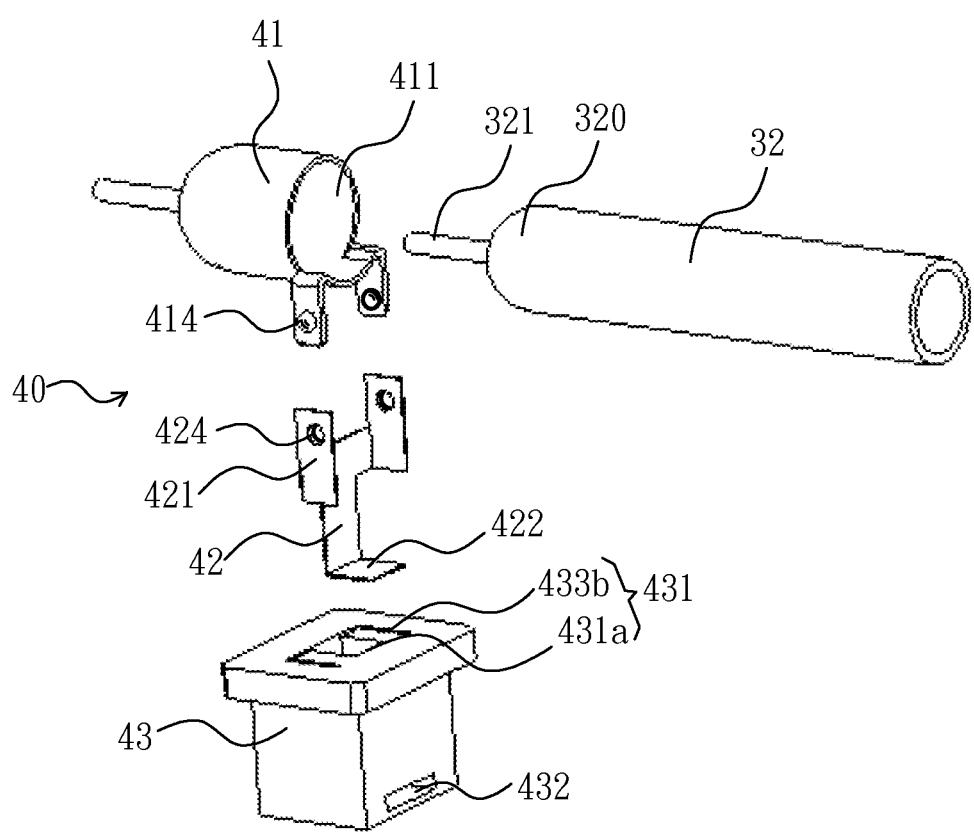
FIG. 5 is a schematic view of a backlight module and a lamp socket structure thereof according to a second embodiment of the present invention.

Referring now to FIG. 5, a backlight module and a lamp socket structure thereof according to a second embodiment of the present invention is similar to the first embodiment of the present invention, and thus uses similar element terms and numerals, but the difference characteristic of the second embodiment is that the backlight module 30 and the lamp socket 40 structure of the second embodiment comprises the two elastic plug plates 412 of the conductive sleeve 41, each of which has at least one projection 414, and the two elastic receptacle plates 421 of the conductive receptacle 42, each of which has at least one opening 424 (or recess), wherein the projection 414 is formed on the outer surface of the two elastic plug plates 412, while the opening 424 (or recess) is formed (or sunk) on the inner surface of the two elastic receptacle plates 421. Thus, in installation, the two elastic plug plates 412 can be inserted into a space between the two elastic receptacle plates 421. In this case, the outer surface of the two elastic plug plates 412 can be tightly in contact with and electrically connected to the inner surface of the two elastic receptacle plates 421, while the projection 414 of the two elastic plug plates 412 can be correspondingly engaged with the opening 424 (or recess) of the two elastic receptacle plates 421, in order to ensure the reliability of the electrical connection between the two elastic receptacle plates 421 and the two elastic plug plates 412. However, the foregoing inner/outer installation relationship between the two elastic plug plates 412 and the two elastic receptacle plates 421 can be interchanged.

Figure 6:
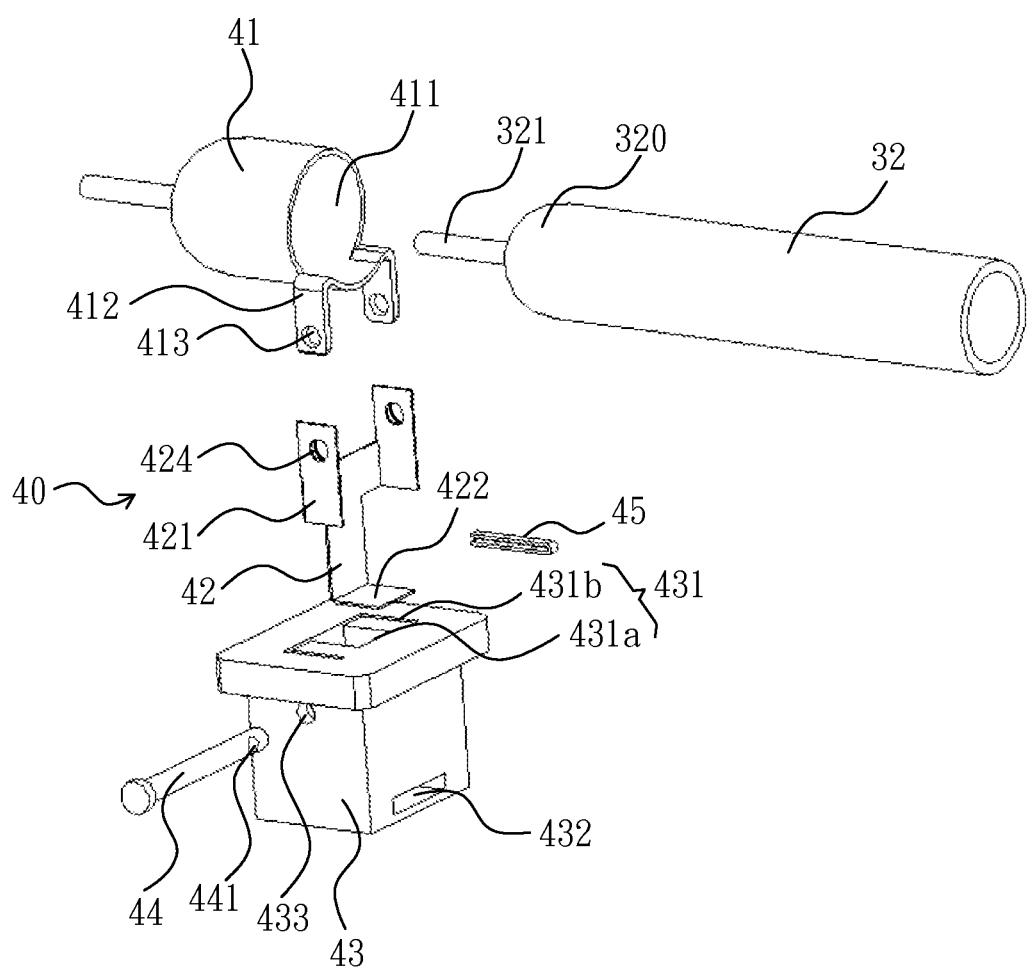
FIG. 6 is a schematic view of a backlight module and a lamp socket structure thereof according to a third embodiment of the present invention.

Referring now to FIG. 6, a backlight module and a lamp socket structure thereof according to a third embodiment of the present invention is similar to the first and second embodiments of the present invention, and thus uses similar element terms and numerals, but the difference characteristic of the third embodiment is that the backlight module 30 and the lamp socket 40 structure of the third embodiment comprises the two elastic plug plates 412 of the conductive sleeve 41, each of which has at least one first opening 413, and the two elastic receptacle plates 421 of the conductive receptacle 42, each of which has at least one second opening 424, wherein the first opening 413 is corresponding to the second opening 424. The lamp socket 40 further comprises at least one pin 44, wherein the pin 44 can pass through the first and second openings 431,424 to connect the two elastic plug plates 412 and the two elastic receptacle plates 421. For more details, the insulation base 43 further comprises at least one pin hole 433, wherein the pin hole 433 is corresponding to the first and second openings 431,424, and the pin can pass through the pin hole 433 and the first and second openings 431, 424. Moreover, the lamp socket 40 further comprises at least one bolt 45, and the pin 44 further has at least one bolt hole 441, wherein the bolt 44 can be engaged in the bolt hole 441 of the pin 44, so as to prevent the pin 44 from being separated from the pin hole 433 and the first and second openings 431, 424.

As described above, in comparison with the traditional lamp socket structure which easily causes various disadvantages, such as the breakage of a connection position between the lead wire and the backlight lamp, the leakage of gas in the backlight lamp, the loose of the electrode terminals, no firmly electrical connection between the electrode terminals and the internal lead wires or separation of the electrode terminals from the ends of the backlight lamp, the backlight module 30 and the lamp socket structure 40 of the present invention as shown in FIGS. 3 to 6 use the conductive sleeve 41 to receive and electrically connect to the lead wire 321 of the backlight lamp 32, and the conductive sleeve 41 is extended downward to form the two elastic plug plates 412 for connecting to the two elastic receptacle plates 421 of the conductive receptacle 42, wherein the conductive receptacle 42 is further connected to an insulation base 43. The foregoing design can efficiently avoid the lamp breakage problem due to vibrations of the lead wires 321, so as to surely increase the stability of mounting the backlight lamps 32 and the reliability of electrically connecting to the backlight lamps 32. Moreover, the two elastic plug plates 412 of the conductive sleeve 41 can selectively use the projections 414, 423, the openings 413, 424, the recesses or the pins 44 to connect with the two elastic receptacle plates 421 of the conductive receptacle 42, so as to increase the convenience and stability of the lamp socket 40.

The present invention has been described with a preferred embodiment thereof and it is understood that many changes and modifications to the described embodiment can be carried out without departing from the scope and the spirit of the invention that is intended to be limited only by the appended claims.

What is claimed is:

1. A backlight module, wherein the backlight module comprises:
    at least two lamp sockets, wherein each of the lamp sockets comprises:
        a conductive sleeve having an electrical connection hole and two elastic plug plates;
        a conductive receptacle having two elastic receptacle plates and an external terminal, wherein the two elastic receptacle plates are electrically connected to the two elastic plug plates, and the two elastic plug plates are symmetrically extended downward from two sides of a lower edge of an opening of the electrical connection hole, respectively;
        an insulation base having a receptacle hole and an external hole communicated with each other, wherein the external terminal and the two elastic receptacle plates are inserted into the receptacle hole, and the external terminal is aligned with the external hole; and
    at least one backlight lamp, wherein each of two ends of the backlight lamp comprises a lead wire, and the shape of the electrical connection hole is corresponding to that of the end and the lead wire of the backlight lamp;
    wherein the electrical connection hole comprises a U-shape hole portion and an elongated hole portion, wherein the end of the backlight lamp is matched with the U-shape hole portion, and the lead wire of the backlight lamp is matched with the elongated hole portion; and
    wherein each of the two elastic plug plates of the conductive sleeve has at least one first opening, and each of the two elastic receptacle plates of the conductive receptacle has at least one second opening, wherein the first opening is corresponding to the second opening, and the lamp socket further comprises at least one pin, wherein the in can pass through the first and second openings to connect the two elastic plug plates and the two elastic receptacle plates.

2. A backlight module, wherein the backlight module comprises:
    at least two lamp sockets, wherein each of the lamp sockets comprises:
        a conductive sleeve having an electrical connection hole and two elastic plug plates;
        a conductive receptacle having two elastic receptacle plates and an external terminal, wherein the two elastic receptacle plates are electrically connected to the two elastic plug plates; and
        an insulation base having a receptacle hole and an external hole communicated with each other, wherein the external terminal and the two elastic receptacle plates are inserted into the receptacle hole, and the external terminal is aligned with the external hole; and
    at least one backlight lamp, wherein each of two ends of the backlight lamp comprises a lead wire, and the shape of the electrical connection hole is corresponding to that of the end and the lead wire of the backlight lamp; and
    wherein each of the two elastic plug plates of the conductive sleeve has at least one first opening, and each of the two elastic receptacle plates of the conductive receptacle has at least one second opening, wherein the first opening is corresponding to the second opening, and the lamp socket further comprises at least one pin, wherein the in can pass through the first and second openings to connect the two elastic plug plates and the two elastic receptacle plates.

3. The backlight module according to claim 2, wherein the electrical connection hole comprises a U-shape hole portion and an elongated hole portion, wherein the end of the backlight lamp is matched with the U-shape hole portion, and the lead wire of the backlight lamp is matched with the elongated hole portion.

4. The backlight module according to claim 2, wherein the two elastic plug plates are symmetrically extended downward from two sides of a lower edge of an opening of the electrical connection hole, respectively.

5. The backlight module according to claim 2, wherein the two elastic receptacle plates are symmetrically extended upward from two sides of an upper portion of the conductive receptacle, and the external terminal is vertically bent from a lower portion of the conductive receptacle.

6. The backlight module according to claim 2, wherein the receptacle hole of the insulation base comprises a communication hole and two slot holes, wherein the external terminal is inserted into the communication hole, and the two elastic receptacle plates are inserted into the two slot holes.

7. The backlight module according to claim 2, wherein the insulation base further comprises at least one pin hole, wherein the pin hole is corresponding to the first and second openings, and the pin can pass through the pin hole and the first and second openings.

8. A lamp socket structure, wherein the lamp socket structure comprises:
    a conductive sleeve having an electrical connection hole and two elastic plug plates, wherein the shape of the electrical connection hole is corresponding to that of an end of a backlight lamp and a lead wire on the end;

a conductive receptacle having two elastic receptacle plates and an external terminal, wherein the two elastic receptacle plates are electrically connected to the two elastic plug plates; and an insulation base having a receptacle hole and an external hole communicated with each other, wherein the external terminal and the two elastic receptacle plates are inserted into the receptacle hole, and the external terminal is aligned with the external hole; and wherein each of the two elastic plug plates of the conductive sleeve has at least one first opening, and each of the two elastic receptacle plates of the conductive receptacle has at least one second opening, wherein the first opening is corresponding to the second opening, and the lamp socket further comprises at least one pin, wherein the in can pass through the first and second openings to connect the two elastic plug plates and the two elastic receptacle plates.

9. The lamp socket structure according to claim 8, wherein the electrical connection hole comprises a U-shape hole portion and an elongated hole portion, wherein the end of the backlight lamp is matched with the U-shape hole portion, and the lead wire of the backlight lamp is matched with the elongated hole portion.

10. The lamp socket structure according to claim 8, wherein the two elastic plug plates are symmetrically extended downward from two sides of a lower edge of an opening of the electrical connection hole, respectively.

11. The lamp socket structure according to claim 8, wherein the two elastic receptacle plates are symmetrically extended upward from two sides of an upper portion of the conductive receptacle, and the external terminal is vertically bent from a lower portion of the conductive receptacle.

12. The lamp socket structure according to claim 8, wherein the receptacle hole of the insulation base comprises a communication hole and two slot holes, wherein the external terminal is inserted into the communication hole, and the two elastic receptacle plates are inserted into the two slot holes.

13. The lamp socket structure according to claim 8, wherein the insulation base further comprises at least one pin hole, wherein the pin hole is corresponding to the first and second openings, and the pin can pass through the pin hole and the first and second openings.

14. The lamp socket structure according to claim 13, wherein the lamp socket further comprises at least one bolt, and the pin further has at least one bolt hole, wherein the bolt is engaged in the bolt hole of the pin.

* * * * *